Jan. 28, 1969   E. TORNQVIST   3,424,774
NOVEL CATALYST AND PROCESS FOR THE CYCLOTRIMERIZATION
OF CONJUGATED DIOLEFINIC MATERIALS
Filed Feb. 10, 1965

STRUCTURE OF THE ALPHA FORM OF $TiCl_3$

STRUCTURE OF THE BETA FORM OF $TiCl_3$

STRUCTURE OF THE GAMMA FORM OF $TiCl_3$

ERIK TORNQVIST   INVENTOR

BY C. B. Barris

PATENT ATTORNEY

United States Patent Office 3,424,774
Patented Jan. 28, 1969

3,424,774
NOVEL CATALYST AND PROCESS FOR THE CYCLOTRIMERIZATION OF CONJUGATED DIOLEFINIC MATERIALS
Erik Tornqvist, Roselle, N.J., assignor to Esso Research and Engineering Company, a corporation of Delaware
Filed Feb. 10, 1965, Ser. No. 431,641
U.S. Cl. 260—429.5  7 Claims
Int. Cl. B01j 11/00; C07c 3/60, 13/02

This invention relates to a novel catalyst comprising a beta-TiCl$_3$ preparation and more particularly to a novel catalyst comprising co-crystalline beta-TiCl$_3$·$x$AlCl$_3$ in combination with an organometallic compound and in particular an aluminum trialkyl, an aluminum dialkyl halide or a mixture thereof. In one aspect the present invention relates to a novel solid, beta-TiCl$_3$-comprising catalyst component and a method of making said component. In another aspect the present invention relates to a method of making a novel catalyst system useful for the cyclotrimerization of conjugated diolefinic materials, for example, the preparation of trans, trans, trans-1,5,9-cyclo-dodecatriene from 1,3-butadiene. In still another aspect the present invention relates to the use of said novel catalyst system for said cyclotrimerization of conjugated diolefinic materials.

With regard to this latter embodiment, of the four stereoisomers of 1,5,9-cyclododecatriene (CDT) which are theoretically possible, three have been isolated, but only two have been prepared in significant quantities. The latter are the cis, trans, trans (cis, tr., tr.) and the trans, trans, trans (tr., tr., tr.) isomers as shown by the following formulas:

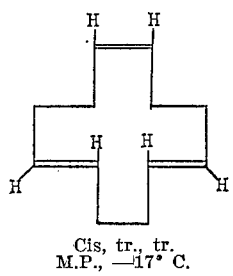
Cis, tr., tr.
M.P., −17° C.

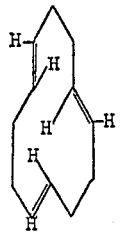
Tr., tr., tr.
M.P., 34° C.

It is well known in the prior art that the foregoing stereoisomers of CDT may be prepared by trimerizing butadiene in the presence of various types of catalysts. For example, CDT can be made by polymerizing butadiene with catalysts formed by the reaction of TiCl$_4$ with aluminum alkyls, such preparation and description being disclosed by Wilke, Angew. Chem., 69, 397 (1957) and J. Polymer Sci., 38, 45 (1959).

It has been also known that a CDT mixture containing about 60% of the trans, trans, trans-form and 40% of the cis, trans, trans-form can be made with catalysts based on chromium compounds and AlR$_3$ as disclosed in the above reference, as well as by Wilke and Kröner in Angew. Chem., 71, 574 (1959).

More recently a complex catalyst containing formally zero-valent nickel has been disclosed which yields tr., tr., tr.-CDT as the main product—but also produces smaller amounts of the cis, trans, trans- and cis, cis, trans-isomers (G. Wilke et al., Advances Chem. Ser. 34, 137 (1962)).

While the methods heretofore known in the art represented a noteworthy advance, one disadvantage has been that only the cis, trans, trans-form could be synthesized with the aid of cheap titanium chloride-aluminum alkyl-based catalysts, while in general because of its higher reactivity, the trans, trans, trans-form has been preferred as a starting material for chemical syntheses.

It is, therefore, an object of the present invention to derive an improved catalyst for the cyclotrimerization of conjugated diolefinic materials which comprises a titanium chloride in combination with one or more organoaluminum compounds. A particular object is to provide a catalyst which is instrumental in obtaining high yields of and good selectivity toward tr., tr., tr.-CDT from butadiene. Another object is to provide an improved catalytic process for the preparation of tr., tr., tr.-CDT from butadiene in high yields and with good selectivity. Other objects will be apparent from the discussion hereinafter.

The above and other objects are accomplished by employing a catalyst system comprising a beta-TiCl$_3$ preparation, preferably co-crystalline beta-TiCl$_3$·$x$AlCl$_3$ in combination with an aluminum trialkyl, an aluminum dialkyl halide or a mixture thereof. While it is not intended to limit the present invention to any particular theory for the improvement obtained, the present invention may be more clearly understood by considering that the catalyst on which said invention is predicated differs from the prior art catalyst in structural formula as represented in FIGURES 1 through 6 in drawings appended hereto.

Of the modifications illustrated in said drawings, two forms, i.e., the purple alpha form first thoroughly described by Klemm and Krose (Z. Anorg. Chem., 253, 218 (1947)) and the likewise purple gamma form discovered by Langer and Tornqvist (see copending patent application Ser. No. 377,154) and first described by Natta (Atti Acc. Naz. Lincei, 26, 155 (1959)), exhibit a layer lattice structure in which small positively charged titanium ions are placed in octahedral holes formed by six chloride ions from the two adjacent closest-packed chlorine layers. However, as illustrated, each chlorine layer has only titanium atoms on one side, so that the crystal is built up of Cl-Ti-Cl double layers which are stacked upon each other. The difference between the alpha and the gamma forms is that the former has a hexagonal closest-packing arrangement for the chlorine layers while the latter has a cubic closest-packing arrangement as illustrated in FIGURES 1, 2, 5 and 6. With such arrangement, each titanium is automatically coordinated with six chlorine atoms. In order to obtain electroneutrality, as well as the correct composition, i.e. TiCl$_3$, each chlorine must be associated with two titanium atoms. However, inasmuch as the double layers have three equivalent positions in which titanium atoms can be placed relative to each chlorine atom, every third octahedral hole must be empty.

The beta form, which was discovered by Böck and Moser (Monatsh. 33, 1407 (1912)) and first described in detail by Natta (Atti Acc. Naz. Lincei, 24, 121 (1958)), forms, on the other hand, a fiber-like structure in which the titanium atoms are also located in the octahedral holes formed by six chlorine atoms. Electroneutrality, as well as the correct composition, is obtained by putting titanium atoms on each side of three closest-packed chlorine atoms and by making each fiber a self-contained unit. A crystal is then formed by placing several fiber units next to each other in such a manner that the chlorine atoms become hexagonally closest-packed. This is illustrated in FIGURES 3 and 4.

Figure 1:
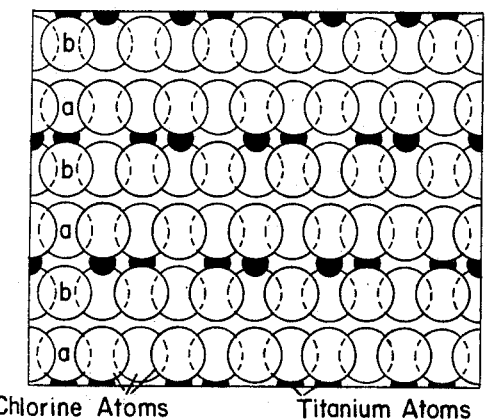
FIGURE 1 represents the side view of the structure of the alpha form of titanium trichloride taken in cross section along the line I—I in FIGURE 2.
Figure 2:
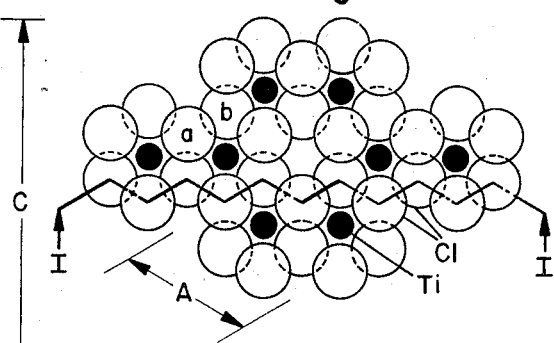
FIGURE 2 represents the top view of the structure of the alpha form of titanium trichloride.
Figure 3:
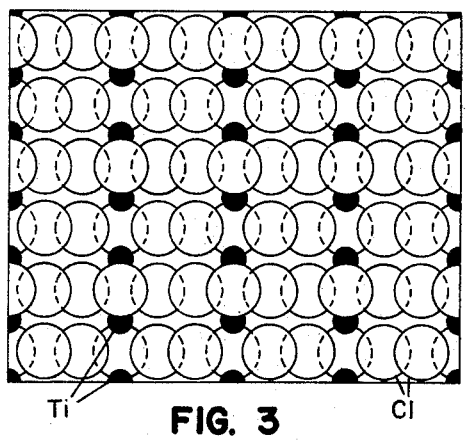
FIGURE 3 represents the side view of the structure of the beta form of titanium trichloride taken in cross section along the line III—III in FIGURE 4.
Figure 4:
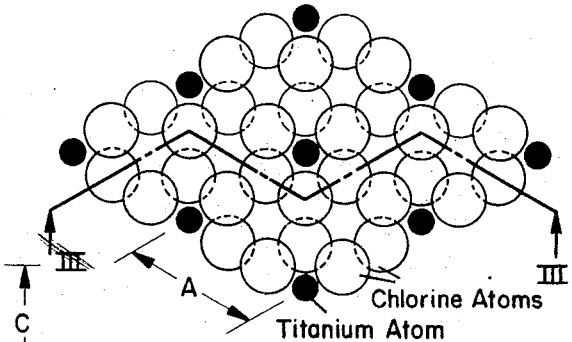
FIGURE 4 represents the top view of the structure of the beta form of titanium trichloride.
Figure 5:
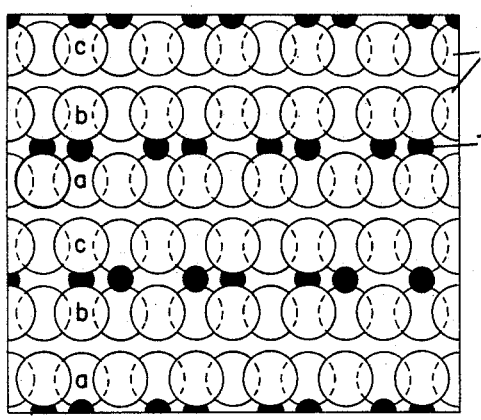
FIGURE 5 represents the side view of the structure of the gamma form of titanium trichloride taken in cross section along the line V—V in FIGURE 6.
Figure 6:
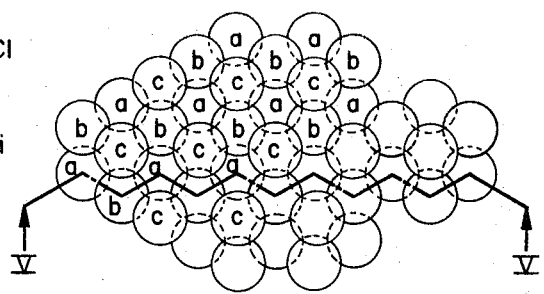
FIGURE 6 represents the top view of the structure of the gamma form of titanium trichloride.

Inasmuch as the present invention also contemplates the use of co-crystalline beta-TiCl$_3$·$x$AlCl$_3$, wherein $x$ is from close to 0 to about 1, it should be noted that this solid is isomorphous with pure beta-TiCl$_3$, the only difference between the two structures being that a fraction corresponding to $$\frac{x}{1+x}$$

of the titanium atoms shown in FIGURES 3 and 4 has been replaced by aluminum atoms in beta-TiCl$_3$·$x$AlCl$_3$.

In accordance with the present invention, therefore, catalysts which are superior to existing titanium-based catalysts with respect to activity, stereospecificity, monomer selectivity and the like are prepared in essentially quantitative yields by reduction of TiCl$_4$ in a suitable diluent at or below about 100° C. by using highly activated aluminum powder as the reducing agent. The diluent employed should be preferably aromatic, or at least partially aromatic, in character. The resulting catalyst component is essentially pure, highly crystalline, brown beta-TiCl$_3$·$x$AlCl$_3$. Accordingly, such resulting component is employed in combination with an organometallic compound, preferably an aluminum alkyl or aryl, having at least two organic groups, the best catalyst being obtained when a mixture of AlR$_2$Cl and AlR$_3$ is used, R representing an alkyl or aryl group, and in such a ratio to the solid component that the ratio of R to total aluminum is between about 1.7/1 and 2.6/1.

In accordance with the invention, the activated aluminum powder employed as the reducing agent herein must be a highly active metallic powder. Typical as such highly active metallic powders are those prepared in accordance with copending application Ser. No. 351,848, filed Mar. 13, 1964, now Patent No. 3,301,494, of Erik Tornqvist, the description and disclosure of said application being incorporated herein by reference. According to the teaching of said application, highly active metallic powders of malleable metals, e.g. aluminum, can be prepared by attriting the same in the presence of suitable metal halide salts which are utilized as grinding aids. Following the attriting operation the metal halide salt grinding aid is separated from the aluminum powder by employing conventional extraction, reaction-extraction, sublimation or mechanical separation techniques, the latter making use of the difference in physical properties between the aluminum and the halide. The solvent and/or reactants which are employed in the separation operation should be inert to aluminum under the operating conditions used for the separation.

When AlCl$_3$ is the metal halide grinding aid and it is desired to make a co-crystalline TiCl$_3$·$x$AlCl$_3$ preparation in which $x$ is greater than 0.33, i.e. from about 0.33 to 1, part or all of the AlCl$_3$ may be left with the aluminum powder subsequently used for reducing TiCl$_4$ under the critical conditions of this invention, however. A similar situation occurs when the aluminum powder has been ground with a co-crystalline halide of the same composition as the halide to be prepared in the subsequent reduction of TiCl$_4$, e.g. beta-TiCl$_3$·0.33AlCl$_3$. In the latter case, which is another preferred method of activating the aluminum, no need for halide removal exists, since the presence of the halide will not alter the composition of the final desired co-crystalline titanium-aluminum chloride product.

The metal halide grinding aids employed in the preparation of the highly active metallic powders prevent agglomeration of the aluminum powder and also serve as reactive abrasives, thus aiding the removal of the coating on the metal surface. As a result aluminum treated in this manner shows a much higher reactivity than aluminum activated according to previously known methods. The grinding aids employed preferably have metal moieties that are at least as electropositive as the metal being milled, i.e., they are either aluminum halides or metal halides, the metal moieties of which are more electropositive than aluminum. For example, AlCl$_3$ may be used advantageously for the activation of aluminum powders, and salts such as aluminum bromide, zinc bromide, stannous chloride and stannous bromide may also be suitably employed. However, under certain conditions it is also possible to use as the grinding aid a metal halide, simple or complex, containing a metal which is somewhat less electropositive than the aluminum to be activated. This is particularly the case when titanium is the less electropositive metal, as in TiCl$_3$·$x$AlCl$_3$. Although a slight reduction of the titanium may occur during the grinding, this is of little significance, since it will be oxidized back to the trivalent state during the subsequent reaction of the AlTiCl$_3$·$x$AlCl$_3$ mixture with TiCl$_4$.

It should be noted that grinding with pure beta-TiCl$_3$, prepared e.g. as described in the subsequent Example 9, or with any beta-TiCl$_3$·$x$AlCl$_3$ preparation in which $x$ is less than 0.33 will yield an Al-TiCl$_3$·$x$AlCl$_3$ mixture which will make it possible to prepare a beta-TiCl$_3$·$x$AlCl$_3$ catalyst component in which $x$ is less than 0.33.

The attriting operation involving the aluminum being activated and the grinding aids is preferably conducted in the absence of a diluent; however, diluents can be used. After the grinding operation has been completed, the grinding aid may be separated from the aluminum powder, if desired, by employing any one or combination of the techniques referred to above.

The solid catalyst component of the present invention may be prepared by any one of a plurality of methods. It is critical, however, in addition to the utilization of highly activated aluminum powders as the reducing agent, that the catalyst contemplated herein be prepared in the presence of an inert aromatic hydrocarbon such as, for example, benzene, toluene, xylene, diphenyl, mesitylene and the like. The amount of aromatic hydrocarbon in the diluent employed may vary over a wide range, for example, from about 10 to 100 weight percent, but the preferred range is 40 to 100 weight percent aromatic hydrocarbon diluent.

One method for preparing the solid catalyst component of this invention is to dissolve 0.2 to 3, preferably about 1 to 2 moles, of TiCl$_4$ in one liter of an aromatic hydrocarbon solvent as above described, and then add the stoichiometric amount of the above-mentioned highly activated aluminum needed for substantially reducing the TiCl$_4$ to TiCl$_3$ and allowing said component to react at a temperature and for a period of time sufficient to cause substantially complete reaction of the aluminum powder. Temperatures of from −20 to 100° C., preferably 25 to 85° C., and contact times ranging from 1 to 360 minutes, preferably 5 to 30 minutes, may be used, the maximum temperature being determined primarily by the temperature at which the tendency for phase transformation to the less desirable gamma or alpha crystalline structures becomes noticeable and the minimum time by the time needed for complete reaction of the activated aluminum. Following this reaction the catalyst component may be recovered by filtration and subsequently thoroughly washed with an inert solvent such as an aliphatic hydrocarbon, for example n-heptane, and then suitably dried prior to use. However, under certain conditions the solid catalyst component slurry may be used directly for preparing the final complete catalyst composition. This is particularly the case when the reduction conditions have been so chosen that complete reduction and removal of TiCl$_4$ have taken place under formation of beta-TiCl$_3$·$x$AlCl$_3$ When properly prepared according to the above-mentioned method, particularly with avoidance of overheating, a TiCl$_3$·$x$AlCl$_3$ preparation is obtained which is isomorphous with the brown crystalline TiCl$_3$ modification now known as beta-TiCl$_3$. It yields a characteristic X-ray diffraction pattern from which the interplanar $d$-spacings shown in Table I can be calculated.

TABLE I.—Interplanar $d$-spacings in beta-TiCl$_3$·$x$AlCl$_3$

| $d$-spacings A. units [1] | Relative intensity of X-ray Diffraction Peaks |
|---|---|
| 5.43 | Very strong |
| 3.13 | Very weak |
| 2.91 | Weak |
| 2.76 | Very strong |
| 2.72 | Very weak |
| 2.57 | Weak |
| 2.13 | Strong |
| 2.05 | Very weak |
| 1.99 | Very weak |
| 1.81 | Medium |
| 1.68 | Weak |
| 1.65 | Medium |
| 1.54 | Very weak |
| 1.51 | Weak |
| 1.46 | Very weak |
| 1.41 | Very weak |
| 1.38 | Weak |

[1] Because of a slight variation in unit cell dimensions with variation in AlCl$_3$ content, a slight deviation from these values may occur.

Another method for preparing a solid TiCl$_3$·$x$AlCl$_3$ catalyst component which can be employed in making the novel catalyst system of this invention comprises reducing TiCl$_4$ under mild conditions of temperature, i.e. below about 80° C., with an alkyl aluminum compound essentially as described in the copending patent application, Ser. No. 667,277. Although not preferred, this method, which is not in itself a part of this invention, will when properly employed yield a solid containing TiCl$_3$·$x$AlCl$_3$ having essentially the crystal structure of beta-TiCl$_3$. However, this solid will also be contaminated with significant amounts of organic substances, notably polyethylene or corresponding polyolefins from alpha-olefins formed during the reduction according to a reaction mechanism exemplified by Equations 1 and 2.

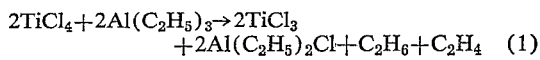

$$2\text{TiCl}_4 + 2\text{Al}(\text{C}_2\text{H}_5)_3 \rightarrow 2\text{TiCl}_3 + 2\text{Al}(\text{C}_2\text{H}_5)_2\text{Cl} + \text{C}_2\text{H}_6 + \text{C}_2\text{H}_4 \quad (1)$$

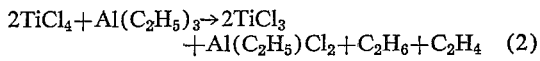

$$2\text{TiCl}_4 + \text{Al}(\text{C}_2\text{H}_5)_3 \rightarrow 2\text{TiCl}_3 + \text{Al}(\text{C}_2\text{H}_5)\text{Cl}_2 + \text{C}_2\text{H}_6 + \text{C}_2\text{H}_4 \quad (2)$$

It should also be noted that very little, if any, AlCl$_3$ will be incorporated in the crystal lattice under the mild conditions required for retaining the beta-TiCl$_3$ structure, since Al(C$_2$H$_5$)Cl$_2$, which is readily soluble in hydrocarbon diluents, will reduce TiCl$_4$ only very slowly, if at all, under these conditions. Besides, if Al(C$_2$H$_5$)Cl$_2$ or a compound more generally corresponding to the formula AlRCl$_2$, where R is an alkyl or aryl radical, reacts with TiCl$_4$ under formation of TiCl$_3$ and AlCl$_3$, this will result in the formation of a co-crystalline material of the composition TiCl$_3$·AlCl$_3$, i.e., a material in which $x$ as defined above, is equal to unity. Any TiCl$_3$ formed previously by reduction of TiCl$_4$ with AlR$_3$ or AlR$_2$Cl will, of course, contain little or no co-crystallized AlCl$_3$. Hence, a homogeneous co-crystalline material of the composition TiCl$_3$·$x$AlCl$_3$ will not be obtained when AlR$_3$ and AlR$_2$Cl are used for the reduction of TiCl$_4$ under conditions yielding a material isomorphous with beta-TiCl$_3$. The solid, co-crystalline, essentially homogeneous catalyst component described by the formula beta-TiCl$_3$·$x$AlCl$_3$ where $x$ represents a value of from close to 0 to about 1, is a new and unique composition of matter, therefore.

The complete catalyst system useful for cyclotrimerizing conjugated dienes, e.g. butadiene to CDT, is then prepared by adding the solid beta-TiCl$_3$·$x$AlCl$_3$ catalyst component to an organoaluminum compound or a mixture of such compounds. Although a wide variety of aluminum compounds may be used for this purpose, particularly advantageous results are obtained in terms of yield of and selectivity toward formation of tr., tr., tr.-CDT when AlR$_3$, AlR$_2$X or a mixture thereof, wherein R is an alkyl or aryl radical and X is a halogen, is used together with the beta-TiCl$_3$·$x$AlCl$_3$ catalyst component. For instance, it has been found that 80% or better selectivity toward formation of the tr., tr., tr. isomer of CDT can be obtained if AlR$_2$X and/or AlR$_3$ are added to beta-TiCl$_3$·$x$AlCl$_3$ in such a proportion that the final aluminum alkyl composition will be AlR$_2$X if all the AlCl$_3$ in the solid reacts with AlR$_3$, as exemplified by Equation 3.

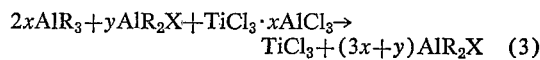

$$2x\text{AlR}_3 + y\text{AlR}_2\text{X} + \text{TiCl}_3 \cdot x\text{AlCl}_3 \rightarrow \text{TiCl}_3 + (3x+y)\text{AlR}_2\text{X} \quad (3)$$

The above equation, which is furnished only to describe one of the preferred catalyst combinations, should not be taken as an explanation of the catalyst forming reaction, since it is not well known. Although some of the AlCl$_3$ in the solid component may react with AlR$_3$, it is actually believed that much of it remains co-crystallized with TiCl$_3$, since there are indications that the final catalyst is heterogeneous in contrast to most of the previously disclosed catalysts for cyclotrimerization of butadiene.

The preparation of the complete catalyst system is most advantageously carried out by first dissolving the organo-aluminum component or components in an inert aromatic hydrocarbon solvent, for example benzene, and then dispersing the beta-TiCl$_3$.$x$AlCl$_3$ component in this solution, preferably after dry ball milling. While unmilled beta-TiCl$_3$.$x$AlCl$_3$ may advantageously be used as a catalyst component as far as the stereoselectivity toward tr., tr., tr.-CDT is concerned, it has been found that considerably higher reaction rates are obtained if the solid component has been milled dry with steel balls for a period from about 2 hours to 10 days or given an equivalent treatment in some other suitable milling or grinding apparatus. However, since severe grinding does cause crystallographic changes, which have an influence on the stereoselectivity of the catalyst, the grinding treatment should not be allowed to exceed the time limit at which these changes start becoming undesirably large.

The catalyst mixture may then be used directly for oligomerizing conjugated dienes, but it is usually beneficial to allow it to age at temperatures ranging from about 25 to 100° C., preferably 25 to 60° C., and for contact times ranging from 1 to 480 minutes, preferably about 10 to 120 minutes, to allow the desired catalyst forming reaction to take place.

It should be noted that the ratio of aluminum to titanium employed in the catalyst of the present invention can be varied within wide limits, i.e. from about 0.5 to 20, preferably from about 1 to 5, calculated on total aluminum, i.e., aluminum in both the organometallic constituents and the AlCl$_3$ originally present in the solid component.

The present oligomerization process is applicable to the trimerization of a wide scope of starting materials. As hereinbefore mentioned, conjugated diolefinic materials such as, for example, 1,3-butadiene, isoprene, piperylene and the like may be trimerized to obtain the cyclotriene product by reacting such materials with the above-described catalysts at temperatures in the range of about 0 to 100° C., preferably 20 to 80° C., and pressures of 0.5 to 10, preferably 1 to 2 atmospheres, the latter depending primarily on the monomer concentration and temperature used in the presence of an inert aromatic, or at least partially aromatic, hydrocarbon diluent. Contact times for the conjugated diolefinic materials with the catalyst may be in the range of from less than 1 to about 100 hours, preferably about 2 to 50 hours. The oligomerization may be carried out either as a batch or as a continuous reaction. In the latter case, the contacting times will be average contacting times usually expressed as the residence or holdup time in the reactor. Weight ratios of diolefinic material to diluent-free catalyst constituents supplied to the reactor can be varied within a wide range of from about 10:1 to 1000:1, but for the sake of obtaining high catalyst efficiencies, it should preferably be above about 100:1. The monomer concentration may likewise be varied within a wide range from about 5 to about 90 weight percent calculated on total monomer-diluent-catalyst charge, but it is preferentially kept in the range of about 15 to 30 weight percent.

In a preferred embodiment of the present invention, 1,3-butadiene is trimerized to obtain 1,5,9-cyclododecatriene in high yield and selectivity toward the trans, trans, trans stereoisomer. In this embodiment the butadiene is reacted with the above-described catalyst in an inert aromatic hydrocarbon solvent, e.g. benzene, employing the reaction conditions set forth above. Following said reaction the product stream containing trans, trans, trans-1,5,9-cyclododecatriene, reaction by-products, e.g., minor proportions of other stereoisomers of cyclododecatriene, butadiene dimers and polybutadiene, as well as catalyst constituents, is mixed with isopropanol or any lower alkanol or water to completely deactivate and decompose the catalyst components. The thus deactivated product-diluent mixture may subsequently be contacted with dilute caustic or acid. When employing acid the catalyst components are converted into water-extractable materials. Such materials are then separated into one aqueous and one organic layer, the latter being passed to a suitable recovery system for separation of tr., tr., tr-CDT, reaction byproducts and unreacted olefins. When steam distillation is used as a means of recovering CDT from the reaction mixture, the steam can be employed to deactivate the catalyst.

In order to further illustrate the practice of the invention, the following examples are provided, but it should be understood, however, that they are not to be construed as limiting the same in any manner whatsoever.

EXAMPLE 1.—Preparation of highly activated aluminum powder

An activated aluminum powder was prepared by milling 324 grams of an aluminum powder (Alcoa #123, average particle size diameter of 16 microns) with 133.4 grams of $AlCl_3$ (Al/$AlCl_3$ molar ratio of 12:1) in a ½-gallon stainless steel jar with chrome-alloy steel balls being employed as the grinding medium. The milling operation was affected for 4 days with a 12:1 ratio of Al to $AlCl_3$ mixture resulting in the form of a finely-divided aluminum colored product. After the grinding operation, substantially pure, activated aluminum powder was prepared by removing a 152.4 gram aliquot of the milled aluminum-aluminum chloride mixture and slurrying it in 350 ml. of n-heptane in a dry, nitrogen-blanketed, 4-necked, 1 liter reaction flask, which was equipped with stirrer, additional funnel, thermometer well and reflux condenser. To the mixture contained in the reaction flask was added 400 ml. of dry n-heptane containing 76.1 grams of dissolved triethyl-aluminum. Said addition was done with stirring over a period of 8 minutes. During the period when the triethyl-aluminum was added to the reaction flask, the temperature of the flask rose from 26 to 36° C. due to the reaction between the aluminum chloride and triethyl-aluminum. The reaction mixture was then stirred for 1 hour whereupon it was filtered in a dry box. After washing with several portions of dry n-heptane and drying in vacuo on a steam bath, a quantitative yield of substantially pure, activated aluminum powder was obtained.

EXAMPLE 2.—Preparation of activated aluminum powder

An activated aluminum powder was prepared in a manner similar to that described in Example 1, but this time the milling was carried out in a 1-gallon porcelain jar with flint pebbles as the grinding medium and with a charge of 972 g. (36 atoms) aluminum powder and 400 g. (3 moles) $AlCl_3$. A 914.4 g. aliquot of the aluminum colored 12Al–1$AlCl_3$ mixture was taken after 17 days of milling. The $AlCl_3$ was then removed from this mixture by reaction with 228.3 g. $AlEt_3$ in 3 liters of dry n-heptane according to the method described in Example 1.

EXAMPLE 3.—Preparation of activated 2Al–1$AlCl_3$ and Al–2$AlCl_3$ mixtures

One activated 2Al–1$AlCl_3$ and two activated Al–2$AlCl_3$ mixtures were prepared by grinding the corresponding mixtures with chrome-alloy steel balls in stainless steel jars. The detailed milling conditions and the results are shown in Table II.

TABLE II.—ACTIVATION OF Al-$AlCl_3$ MIXTURES

| Run | A | B | C |
| --- | --- | --- | --- |
| Charge: | | | |
| Aluminum, g.[1] | 108 | 135 | 162 |
| $AlCl_3$, g | 266.7 | 1,335.5 | [2]133.4 |
| Al/$AlCl_3$ Ratio | 2/1 | 1/2 | 1/2 |
| Milling Conditions: | | | |
| Jar Size, l | 2.5 | 7.7 | 7.7 |
| Time, days | 4 | 5 | [3]5 |
| Color of Product | ([4]) | ([5]) | ([6]) |

[1] Alcoa air atomized grade #123, average particle diameter 16 microns.
[2] The aluminum was ball milled for 4 days with 133.4 g. (1 mole) $AlCl_3$ at an Al/$AlCl_3$ ratio of 6/1 before the remaining 1,467 g. (11 moles) $AlCl_3$ were added and the milling continued for another day at a final Al/$AlCl_3$ ratio of 1/2.
[3] Only 1 day at the final Al/$AlCl_3$ ratio. See footnote 2.
[4] Light aluminum.
[5] Bluish light aluminum.
[6] Darker than Preparation B.

The products of all three experiments were finely-divided powders that appeared homogeneous to the naked eye.

EXAMPLE 4.—Preparation of $TiCl_3 \cdot 0.33AlCl_3$ catalyst component

A 3-liter, 4-necked flask equipped with thermowell, stirrer and reflux condenser was charged inside a nitrogen-containing dry box with the following materials:

| | |
| --- | --- |
| $TiCl_4$, bakers purified (2 moles) g | 379.4 |
| Aluminum powder (activated per Example 1) (⅔ atom) g | 18 |
| Benzene, as diluent l | 1.5 |

An exothermic reaction started immediately upon charging of the reaction materials, and the temperature rose from 26 to 55° C., in 2 minutes, while a brown precipitate was being formed before the flask and its auxiliary equipment could be set up in a hood. Stirring of the contents in the nitrogen-blanketed flask was then started, which caused the temperature to rise spontaneously to 80° C. in 2 more minutes, whereupon heating was applied. Refluxing started at 81° C. after 1 additional minute. The reaction mixture was then heated and allowed to reflux under good stirring for 1 hour at 81 to 81.5° C., whereupon the flask was cooled to room temperature.

The reaction product was recovered by filtration and thorough washing with dry n-heptane and subsequently dried in vacuo on a steam bath. The yield, 336.2 g. of a medium brown powder, was close to quantitative, especially if one takes into account that minor losses during the recovery procedure was unavoidable. The composition of the product corresponded closely to the expected $TiCl_3 \cdot 0.33AlCl_3$ and the crystal structure was that of beta-$TiCl_3$ as evidenced by X-ray diffraction peaks corresponding to the interplaner $d$-spacings listed in Table I. However, weak peaks corresponding to $d$-spacings of 5.85 and 2.52 A. units indicated the presence of small amounts of material having the structure of gamma-$TiCl_3$. This was apparently the result of some unavoidable local overheating during the beginning of the experiment, before good stirring could be applied.

EXAMPLE 5.—Preparation of $TiCl_3 \cdot 0.33AlCl_3$ catalyst component

Titanium tetrachloride was reduced with aluminum powder according to the procedure of Example 4, the only difference being that the activated aluminum powder now used was that prepared according to Example 2.

Although an exothermic reaction occurred also in this case before stirring could be applied as evidenced by a slight heating at the bottom of the reaction flask where the aluminum powder was concentrated, the rate of reaction was so slow that little general temperature increase in the supernatant liquid was noticed before the stirring was started. At that time the temperature began rising at an accelerated rate reaching 29° C. after 6 minutes, 38° C. after 12 minutes, 51° C. after 14 minutes, 76° C. after 15 minutes and the refluxing temperature of 81° C. after 16 minutes. Heating was applied at that moment, and the mixture was allowed to reflux for an additional hour under good stirring, whereupon the flask was cooled to room temperature and the solid brown reaction product recovered as described in Example 4.

This time the yield of a product corresponding to the composition $TiCl_3 \cdot 0.33AlCl_3$ was 363 g., i.e. almost quantitative. The crystal structure of the solid was that of beta-$TiCl_3$, as evidenced by the X-ray diffraction peaks corresponding to the interplanar $d$-spacings listed in Table I. Only very weak peaks indicated the presence of minute quantities of material being isomorphous with gamma-$TiCl_3$. This supports the conclusion that the small amount of gamma-type crystal structure present in the solid prepared according to Example 4 was formed as the consequence of local overheating during the early stages of the preparation before stirring was applied, since much less local overheating occurred during the preparation according to this example, which utilized a less strongly activated aluminum powder.

It should be noted, however, that the utilization of highly-activated aluminum powder, i.e., one ball milled with steel balls rather than flint pebbles, is not in itself disadvantageous if equipment is available which allows controlled addition of the aluminum under such good stirring and cooling that local overheating is avoided. Under such conditions, $TiCl_3 \cdot xAlCl_3$ preparations having exclusively the structure of beta-$TiCl_3$ can be obtained.

EXAMPLE 6.—Preparation of $TiCl_3 \cdot 0.33AlCl_3$ components of different structures A series of experiments were effected to illustrate the necessity of employing temperatures below about 100° C. and employing inert, at least partially aromatic diluents for the preparation of the solid $TiCl_3 \cdot xAlCl_3$ catalyst components of this invention by reduction of $TiCl_4$ with aluminum powder. The experiments were carried out essentially as described in Example 4, although on a smaller scale involving 2 liter reaction flasks and only 0.5 liter diluent as indicated in Table III. It is readily seen that almost quantitative yields were obtained in all cases where an aromatic or partially aromatic diluent was employed while essentially no reaction took place in pure n-decane, even though the temperature was as high as 161° C. However, a preparation having the structure of beta-$TiCl_3$ was obtained only in benzene diluent. This further demonstrates the importance of operating at a temperature below about 100° C. The failure of the activated aluminum to reduce $TiCl_4$ in n-decane demonstrates that the presence of an aromatic diluent is necessary for the reaction.

TABLE III.—PREPARATION OF $TiCl_3 \cdot 0.33AlCl_3$ CATALYST COMPONENTS

[1 Mole $TiCl_4$, 1/3 Atom Activated Al Powder [1], 0.5 l. Diluent]

| Run | D | E | F | G |
|---|---|---|---|---|
| Diluent | Benzene | Xylene | n-Decane/Xylene (9/1) | n-Decane [4] |
| Reaction conditions: | | | | |
| Reflux temperature, °C | 81.5 | 138.5 | 163 | 161. |
| Time at reflux temp., hours | 1 | 2 | 0.5 | 1. |
| Yield, g.[2] | 184.2 | 186.1 | 184.0 | 98.9. |
| Color | Yellowish Brown | Purple | Bright Lilac | Dark Violet. |
| Crystal structure [3] | β | α-γ | γ | |

[1] Activated and purified according to Example 1.
[2] After washing and drying. The theoretical yield was 189.7 g.
[3] As compared to α-, β- and γ- $TiCl_3$.
[4] Little reaction had taken place after refluxing for 15 minutes when 75 ml. of xylene was added slowly, and the refluxing continued for 30 minutes.

EXAMPLE 7.—Preparation of $TiCl_3 \cdot 0.5AlCl_3$ and $TiCl_3 \cdot AlCl_3$ catalyst components Three $TiCl_3 \cdot 0.5AlCl_3$ and two $TiCl_3 \cdot AlCl_3$ preparations were made by reduction of $TiCl_4$ with activated Al-$AlCl_3$ mixtures prepared according to Example 3. The general procedure was the same as described in Example 1, although 2-liter diluent was used and the refluxing periods were shortened to less than 1 hour in order to minimize crystal structure transformations toward the alpha and gamma forms.

The results reported in Table IV clearly show that also for $TiCl_3 \cdot 0.5AlCl_3$ and $TiCl_3 \cdot AlCl_3$ components both an aromatic diluent and a temperature below about 100° C. are important for obtaining a good yield of material having essentially beta-$TiCl_3$ structure.

TABLE IV.—PREPARATION OF $TiCl_3 \cdot 0.5AlCl_3$ AND $TiCl_3 \cdot AlCl_3$ CATALYST COMPONENTS

[2 Moles $TiCl_4$, 2/3 Atom Activated Al Powder [1], 2 l. Diluent]

| Run | H | I | J | K | L |
|---|---|---|---|---|---|
| $TiCl_3 \cdot xAlCl_3$ to be prepared | $TiCl_3 \cdot 0.5AlCl_3$ | $TiCl_3 \cdot 0.5AlCl_3$ | $TiCl_3 \cdot 0.5AlCl_3$ | $TiCl_3 \cdot AlCl_3$ | $TiCl_3 \cdot AlCl_3$. |
| Diluent [2] | n-Hexane/Benzene (4/1) | n-Hexane/Benzene (1/1) | n-Decane/Xylene (4/1) | Benzene | n-Decane/Xylene (4/1) |
| Activated Aluminum Preparation: | | | | | |
| Preparation [3] | A | A | A | C | B. |
| Composition | 2Al-1$AlCl_3$ | 2Al-1$AlCl_3$ | 2Al-1$AlCl_3$ | Al-2$AlCl_3$ | Al-2$AlCl_3$. |
| Reaction Conditions: | | | | | |
| Reflux temperature, °C | 71.5 | 72 | 155 | 81 | 160. |
| Time at reflux temp., hours | 0.67 | 0.33 | 0.33 | 0.5 | 0.5. |
| Yield, g | 284.2 [4] | 392.2 [4] | 401 [4] | 554.2 [5] | 533.3 [5] |
| Crystal Structure | β-((γ)) Medium | β-((γ)) High | β-(γ) Low | β-(γ) Low | (β)-γ Medium |

NOTE.—Composition:
[1] Added as activated Al-$xAlCl_3$ mixture. [2] The figures in parentheses indicate the volume proportions of the diluent components. [3] See Example 3, Table II. [4] The theoretical yield was 441.8 g. [5] The theoretical yield was 575.2 g. [6] As determined from visual inspection of X-ray diffraction pattern and comparison with the known patterns for α-, β-, and γ-$TiCl_3$. The order of increasing *relative* strength is indicated in the following manner: ((β)), (β), β, β. Thus β-((γ)) means that the preparation has a very clear β-pattern with only traces of the γ-pattern visible.

It should also be noted that strong activation of the aluminum is required for the reaction, since high quality commercial aluminum powders, such as Alcoa #101 and #123, fail to react properly under the conditions needed for making beta-$TiCl_3 \cdot xAlCl_3$, as indicated in copending patent application Ser. No. 351,848, filed Mar. 13, 1964.

A comparison of Runs H and I shows, for instance, that although both preparations yield solids of almost pure beta structure, as would be expected for refluxing at 71.5 to 72° C., only Run I, which has the more aromatic diluent, yields an almost quantitative yield. Furthermore, this higher yield of a more crystalline material is obtained in only half the reaction time used for Run H.

A comparison between Runs I and J clearly shows that the use of a diluent boiling above 100° C. results in the formation of considerable amounts of material having gamma structure also when short reaction times are used.

Runs K and L demonstrate essentially the same phenomena for preparations having the composition $$TiCl_3 \cdot AlCl_3,$$

although in this case the results are slightly obscured by the fact that $AlCl_3$ has a great tendency to crystallize with the structure of gamma-$TiCl_3$. Thus $TiCl_3 \cdot AlCl_3$ represents about the upper limit for $AlCl_3$ content in the beta-$TiCl_3 \cdot xAlCl_3$ catalyst components of this invention.

EXAMPLE 8.—Preparation of beta-$TiCl_3 \cdot 0.33AlCl_3$ by reduction of $TiCl_4$ with aluminum powder activated by ball milling with beta-$TiCl_3 \cdot 0.33AlCl_3$ An activated aluminum powder was first prepared by ball milling 324 g. (12 atoms) aluminum powder with 149.1 g. of the beta-$TiCl_3 \cdot 0.33AlCl_3$ preparation made according to Example 4. Aside from the difference in charge, the milling conditions were the same as described in Example 1. At the end of the milling period a quantitative yield was obtained of a finely-divided brown powder having the composition 16Al-$TiCl_3 \cdot 0.33AlCl_3$.

Beta-$TiCl_3 \cdot 0.33AlCl_3$ was then prepared by reducing $TiCl_4$ with this activated aluminum powder according to the procedure described in Example 4. However, this time the halide used in the grinding, i.e. beta-$TiCl_3 \cdot 0.33AlCl_3$, was not removed, since it was not expected to have any undesirable effect on the composition of the final product. Consequently, 26.3 g. of the activated $$16Al-TiCl_3 \cdot 0.33AlCl_3$$

mixture was used instead of 18 g. pure aluminum powder. Furthermore, in order to prevent local overheating during the charging procedure, the diluent-$TiCl_4$ mixture was cooled to about 0° C. before the activated aluminum-containing mixture was added to the reaction flask. This made it possible to transfer the flask to the hood with only a little reaction taking place before good stirring could be effected.

Recovery, according to the previously described method, furnished a yield of 375.3 g. of a finely-divided, medium brown powder having the composition $TiCl_3 \cdot 0.33AlCl_3$. Its X-ray diffraction pattern revealed that it was isomorphous with beta-$TiCl_3$. Diffraction peaks corresponding to gamma-$TiCl_3$ were hardly detectable, indicating that complete avoidance of local overheating during the charging procedure will make it possible to prepare $TiCl_3 \cdot xAlCl_3$ preparations having essentially the structure of beta-$TiCl_3$.

EXAMPLE 9.—Preparation of beta-$TiCl_3$

An aluminum-free $TiCl_3$ preparation was made by gamma ray initiated reduction of $TiCl_4$ in n-heptane at about 40° C. For this purpose seven 1-liter graduated cylinders were each charged with 900 ml. dry n-heptane and 50 g. $TiCl_4$ and placed in a radiation cave. The closed cylinders, which were connected to each other and to a dry nitrogen source for the purpose of blanketing from air and moisture, were placed in a circle with a radius of about 15 cm. measured to the center of each cylinder. Four 6 cm. wide $Co^{60}$ plates, each having a radiation intensity (radioactivity) of 1715 curies in the form of gamma rays, were then placed upright and edge to edge in the middle of the circle in such a manner that they formed a square in cross section with a distance of about 12 cm. from the middle of each plate to the circle formed by the centers of the cylinders. The cylinders were then irradiated under these conditions for 6 days, whereupon the radioactive source was removed. At that time each cylinder contained a very thick yellowish brown slurry.

The brown precipitate was filtered off in a dry box and washed very carefully with dry btnzene, whereupon it was dried in vacuo on a steam bath. The yield, 151 g. of a medium brown powder having the composition $TiCl_{2.87}$, indicated that about 53% of the $TiCl_4$ had been reduced. In addition to titanium and chlorine, the solid also contained about 2% organic (hydrocarbon) matter which has a H/C ratio of slightly more than 2. Apparently the drying procedure had failed either to completely remove the original n-heptane diluent or to break some n-heptyltitanium bonds formed during the reduction. The crystal structure of the solid was exactly that of beta-$TiCl_3$ with not even a hint of gamma-$TiCl_3$ being present.

Because of the hydrocarbon contamination, it was decided to purify the preparation further. For this purpose 38.6 g. of the solid was charged to a 0.5 liter stirred, nitrogen-blanketed reaction flask containing 47.4 g. $TiCl_4$ dissolved in 250 ml. dry benzene. The contents of the flask were heated to 65 to 70° C. for 48 hours under good stirring, whereupon the brown solid was recovered and dried as previously described. Analyses showed that it now had the composition $TiCl_{2.99}$ with hardly any organic material being present. The X-ray diffraction pattern remained that of pure beta-$TiCl_3$, further demonstrating that this type of structure is obtained if the temperature is held below about 100° C. and local overheating is avoided.

In this particular case, no aromatic diluent was needed for the reduction, since the necessary energy was furnished by the gamma radiation. By contrast, as clearly demonstrated in Example 6, little or no reduction of $TiCl_4$ with aluminum powder will take place even at temperatures well above 100° C., unless significant amounts of an aromatic diluent are present. Furthermore, even in the presence of an aromatic diluent, reduction at a temperature below about 100° C. will not take place unless highly activated aluminum is employed.

The following Examples 10 through 15 further illustrate the concept of this invention. Essentially the same basic procedure was utilized in each of the experiments incorporated therein. Such procedure was as follows:

Quart size Soda King bottles were oven dried at 100° C. and transferred while hot to a dry box. After flushing with dry nitrogen, while still hot, and subsequent cooling, the bottles were charged with 500 ml. of dry diluent, usually sodium dried benzene. The alkyl metal component of the catalyst was then added, followed by the solid titanium chloride component. After thorough mixing of the contents, 95 to 100 g. of liquid 1,3-butadiene (dried with Drierite and $CaCl_2$ in gas phase) were added under thorough mixing. The bottles were then transferred to a paddle wheel stirrer submerged in a temperature controlled water bath.

The oligomerizations were terminated by pouring the contents of each bottle into 1 liter of dry isopropyl alcohol containing 0.5 g. phenyl β-naphthylamine (PBN). The supernatant alcohol phase was slowly stirred so as to bring the product diluent mixture into contact with the alcohol and avoid agglomeration of diluent-rich high molecular weight polymer, if such polymer were present. The mixture was then allowed to stand at room temperature, if necessary with occasional kneading of any high molecular weight polymer present to insure complete reaction between the catalyst components and the alcohol.

When a high molecular weight polymer was present, it was filtered off and then suspended again in 0.5 liter or less (depending upon quantity of such polymer formed) of isopropyl alcohol containing 0.5 g. PBN per liter. If necessary, the polymer was given additional kneading while standing in this second alcohol wash to insure complete extraction of catalyst components and low molecular weight polymers, particularly dimers and trimers. After several hours the polymer was again filtered off, resuspended in an equal amount of dry isopropyl alcohol containing 1 g. PBN per liter of alcohol and subsequently chopped up in a Waring Blendor. The polymer was allowed to stand in the alcohol for some hours and then filtered off and dried in a vacuum oven at 30 to 40° C.

The combined filtrates were treated with an equal amount of distilled water in a separatory funnel to remove any isopropyl alcohol from the diluent-oligomer mixture. After withdrawal of the heavy alcohol-containing aqueous phase, the organic phase was extracted twice more with 1½ volumes of distilled water. At times the separation of the phases was made difficult by the formation of an almost stable emulsion during the second extraction. This problem was overcome by removing the emulsifying agent by filtration.

After the last extraction the organic phase was analyzed by gas chromatography to establish the presence of volatile dimers and trimers and to determine their relative amounts. The liquid was then stripped of benzene and isopropyl alcohol at atmospheric pressure with the help of a spinning band column at a reflux ratio of 3/1, whereupon the stripped residue was distilled in a microapparatus, usually at 0.1 mm. Hg. Under these conditions butadiene dimers and residual benzene were collected in a Dry Ice trap while the trimers (CDT), which boiled at about 42° C., were collected in a wet ice cooled receiver. The dimers and the benzene were then separated by distillation at atmospheric pressure.

EXAMPLE 10.—Effect of variation in TiCl$_3$ composition and structure

A series of butadiene oligomerizations was carried out as described above with a variety of TiCl$_3$ and TiCl$_3$·0.33 AlCl$_3$ preparations. The metal alkyl was added as pure AlEt$_2$Cl to the pure TiCl$_3$ preparations and as a mixture of AlEt$_3$ and AlEt$_2$Cl to the TiCl$_3$·0.33AlCl$_3$ preparations. The composition of this mixture was calculated to yield AlEt$_2$Cl after reaction of the AlEt$_3$ with the AlCl$_3$ in the solid component according to $$2AlEt_3 + AlCl_3 \rightarrow 3AlEt_2Cl \qquad (4)$$

On the assumption that this reaction did take place, all catalysts had the final composition 2AlEt$_2$Cl-TiCl$_3$.

The results reported in Table V clearly show the superiority of the beta forms of TiCl$_3$ and TiCl$_3$·0.33AlCl$_3$ which give higher yields of CDT and higher selectivity toward the tr., tr., tr.-form than the corresponding alpha and gamma forms.

EXAMPLE 11.—Effect of variation in alkyl metal composition

A series of cyclomerization experiments was carried out as described above with catalysts consisting of the alpha or beta forms of TiCl$_3$ in combination with AlEtCl$_2$, AlEt$_2$Cl or AlEt$_3$.

The data reported in Table VI clearly show the effect of both TiCl$_3$ crystal structure and metal alkyl composition on the CDT formation. Thus essentially pure cis, tr., tr.-CDT is obtained in fairly good yields from both forms of TiCl$_3$ when AlEtCl$_2$ is the metal alkyl, in complete agreement with previous experience. However, in combination with AlEt$_2$Cl and/or AlEt$_3$, α- and β-TiCl$_3$ behave entirely differently. Here the β-form is far superior both with respect to total CDT yield and selectivity toward tr., tr., tr.-CDT.

EXAMPLE 12.—Effect of variation in alkyl metal composition

A series of butadiene oligomerizations was carried out as in previous examples but with β-TiCl$_3$·0.33AlCl$_3$ in combination with a variety of alkylaluminum compounds. As in Example 10, the final composition of the alkyl metal was calculated on the assumption that all AlCl$_3$ in the solid component reacted in analogy with Equation 4.

From the data in Table VII it can be readily seen that the alkyl metal composition greatly influences the CDT yield and the selectivity toward one of the two isomers. Thus good yields of almost pure cis, tr., tr.-CDT are obtained with AlEtCl$_2$, while AlEt$_2$Cl gives good yields and high selectivity toward the tr., tr., tr.-form. This illustrates, of course, in a striking manner the versatility of cyclotrimerization catalysts based upon beta-TiCl$_3$·xAlCl$_3$ components, since by proper choice of the alkylaluminum component, the oligomerization can be directed toward either of the two CDT isomers, something that has previously not been possible with any other transition metal component.

TABLE VI.—VARIATION IN ALUMINUM ALKYL STRONGLY INFLUENCES CDT PRODUCTION

[Butadiene Oligomerization at 25° C. in Benzene Diluent]

| | Solid Component [1] | | | | | |
|---|---|---|---|---|---|---|
| | α-TiCl$_3$ | | | β-TiCl$_3$ | | |
| Aluminum Alkyl | AlEtCl$_2$ | AlEt$_2$Cl | AlEt$_3$ | AlEtCl$_2$ | AlEt$_2$Cl | AlEt$_3$ |
| Total CDT, g | 11.1 | 6.6 | (3) | 27.0 | [2] 38.4 | 3.6 |
| Tr., tr., tr.-CDT, percent | 0 | 12.6 | 0 | 0.4 | 27.3 | 40.4 |

[1] The solid components were prepared and treated as indicated in Table V.
[2] Contained about 1% of cis, cis, tr.-CDT.
[3] Trace.

TABLE V.—CATALYST COMPOSITION STRONGLY INFLUENCES CDT PRODUCTION
[Butadiene Oligomerization at 25° C. for 48 hrs., AlEt$_2$Cl/TiCl$_3$=2 [1]]

| Solid Component | α-TiCl$_3$ | β-TiCl$_3$ | α-TiCl$_3$· 0.33AlCl$_3$ | β-TiCl$_3$· 0.33AlCl$_3$ | γ-TiCl$_3$ 0.33AlCl |
|---|---|---|---|---|---|
| Method of Preparation | H$_2$ Reduction of TiCl$_4$ [2] | Example 9 | U.S. Patent 3,128,252. | Example 4 | RunF$_3$· |
| Ball Milling Time, days [3] | 6 | (4) | 5 | 6 | 6. |
| Total CDT, g | 6.6 | 38.4 | 2.9 | 38.1 | 12.3. |
| Tr., tr., tr.-CDT, percent | 12.6 | 27.3 | 48 [5] | 802 | 54.1. |

[1] On the assumption that AlEt$_3$ reacts with AlCl$_3$ in the solid component according to Equation 4.
[2] Supplied in unmilled form by Stauffer Chemical Company.
[3] With chrome alloy steel balls in a stainless steel jar.
[4] Treated in a small vibromill corresponding to about 3 days of ball milling.
[5] Accuracy may be low because of the small amount formed.

TABLE VII.—VARIATION IN ALUMINUM ALKYL STRONGLY INFLUENCES CDT PRODUCTION

[Butadiene Oligomerization at 25° C. in Benzene Diluent]

| | Solid Component [1] | | | | |
|---|---|---|---|---|---|
| | $\beta$-TiCl$_3$.0.33AlCl$_3$ | | | | |
| Aluminum Alkyl | AlEtCl$_2$ | AlEt$_{1.33}$Cl$_{1.67}$ | AlEt$_{1.67}$Cl$_{1.33}$ | AlEt$_2$Cl | AlEt$_{2.5}$Cl$_{0.5}$ |
| Total CDT, g | 77.7 | 51.1 | 45.7 | 44.2 | 12.3 |
| Tr., tr., tr.-CDT, percent | 0.3 | 2.4 | 9.8 | 77.5 | 40.5 |

[1] Prepared according to Example 4 and milled with steel balls for 6 days.

EXAMPLE 13.—Influence of amount of co-crystallized AlCl$_3$ and of crystal structure Table VIII shows data from oligomerizations in which TiCl$_3$·xAlCl$_3$ preparations of varying composition were used together with AlEt$_2$Cl as the calculated second component. The beneficial effect of co-crystallized AlCl$_3$ in beta-TiCl$_3$·xAlCl$_3$ components is readily seen. An optimum as far as selectivity toward tr., tr., tr.-CDT is concerned seems to occur for an x-value of about 0.5, while the general selectivity toward CDT seems to increase up to and beyond an x-value of about 1. The importance of using a solid of predominantly beta structure for obtaining a good yield of tr., tr., tr.-CDT is clearly demonstrated also for TiCl$_3$·0.5AlCl$_3$ and TiCl$_3$·AlCl$_3$ preparations by the superior results obtained in Runs O and Q as compared to Runs P and R.

involving propylene polymerization at atmospheric pressure.

For this purpose a 0.5 g. aliquot of a six day steel ball milled fraction of the catalyst prepared according to Example 4 was added to 100 ml. xylene in an addition funnel and activated with 0.475 g. triethylaluminum. After about 15 minutes the catalyst slurry was added to a glass polymerization unit containing 900 ml. xylene saturated with propylene at 60° C. and equipped with a stirrer and a dip tube for continuous introduction of dry monomer. The temperature was brought to 75° C. within 10 minutes and the polymerization continued at this temperature for an additional 50 minutes under continued monomer addition and good stirring. After 1 hour of total polymerization time, the reaction was terminated and the polymer precipitated by the addition of 2 volumes of

TABLE VIII.—AMOUNT OF COCRYSTALLIZED AlCl$_3$ AND CATALYST STRUCTURE INFLUENCE CDT PRODUCTION

[Butadiene Oligomerization at 25° C., AlEt$_2$Cl Activator [1]]

| | Run | | | | | |
|---|---|---|---|---|---|---|
| | M | N | O | P | Q | R |
| Solid Component [2] | $\beta$-TiCl$_3$ | $\beta$-(($\gamma$))-TiCl$_3$.0.33AlCl$_3$ | $\beta$-(($\gamma$))-TiCl$_3$. 0.5AlCl$_3$ | $\beta$-($\gamma$)-TiCl$_3$. 0.5AlCl$_3$ | $\beta$-($\gamma$)-TiCl$_3$. AlCl$_3$ | ($\beta$)-$\gamma$-TiCl$_3$. AlCl$_3$ |
| Method of Preparation | Ex. 9 | Ex. 4 | Ex. 7 | Ex. 7 | Ex. 7 | Ex. 7 |
| Ball Milling Time, days [3] | ([4]) | 6 | 6 | 6 | 6 | 6 |
| Al/Ti Ratio [5] | 2 | 2 | 1.5 | 1.5 | 3 | 3 |
| Total CDT, g | [6] 38.4 | 44.2 | 43.8 | [6] 13.4 | 51.4 | [7] 39.1 |
| Tr., tr., tr.-CDT, percent | 27.3 | 77.5 | 79.2 | 27.6 | 64.2 | 25.1 |

[1] See Table V, Footnote 1.   [2] For explanation of structure symbols, see Table IV, Footnote 6.   [3] See Table V, Footnote 3.   [4] See Table V, Footnote 4.   [5] Includes AlCl$_3$ in solid component.   [6] Contained about 1% of cis, cis, tr.-CDT.   [7] Contained about 0.5% of cis, cis, tr.-CDT.

EXAMPLE 14.—Effect of diluent

The importance of using an aromatic diluent for obtaining high CDT yields was demonstrated in a series of experiments in benzene and in n-heptane with catalysts consisting of $\beta$- or $\gamma$-TiCl$_3$·0.33AlCl$_3$ in combination with AlEt$_2$Cl (calculated composition).

The superiority of the aromatic diluent is clearly shown by the data in Table IX, although $\beta$-TiCl$_3$·0.33AlCl$_3$ still gives results far superior to those of the $\gamma$-form also in n-heptane.

TABLE IX.—CDT PRODUCTION IS STRONGLY INFLUENCED BY THE DILUENT

[Butadiene Oligomerization at 25° C. for 48 hours, AlEt$_2$Cl/TiCl$_3$=2]

| Diluent | Benzene | | n-Heptane | |
|---|---|---|---|---|
| TiCl$_3$·0.33AlCl$_3$ Component | $\beta$-Form | $\gamma$-Form | $\beta$-Form | $\gamma$-Form |
| Total CDT, g | 38.1 | 12.3 | 4.1 | 0 |
| Tr., tr., tr.-CDT, percent | 80.2 | 54.1 | 83.5 | ---------- |

EXAMPLE 15.—Effect of temperature

A series of butadiene oligomerizations was carried out at 25°, 50° and 60° C. in benzene diluent with the catalyst used in Run N. The total CDT yields were 44.2, 37.8 and 34.8 g. and the selectivity toward the tr., tr., tr.-form, 77.5, 75.8 and 79.4%, respectively. This indicates that the trimerization reaction is rather insensitive to variation in temperature within this range, although an optimum temperature probably exists for each catalyst combination, as can be established by more detailed experimentation.

EXAMPLE 16.—Polymerization of propylene

The more general utility of the novel beta-TiCl$_3$·xAlCl$_3$ components as oligomerization or polymerization catalyst components was demonstrated in an experiment isopropanol containing 3 ml. acetylacetone, whereupon the precipitated polymer was filtered off. The filtered polymer was given a second isopropanol wash, filtered again and dried in a vacuum oven. A yield of 61.4 g. of a solid plastic grade polymer having a viscosity average molecular weight of 475,000 and a density of 0.8964 g./cc. was obtained.

Other similar experiments demonstrated that the same catalyst was able to polymerize ethylene in good yield to a high molecular weight, high density, plastic grade polymer.

It is to be understood that this invention is not limited to the specific examples, which have been offered merely as an illustration, and that modification may be made without the departing from the spirit of this invention.

What is claimed is:

1. An improved catalyst for the trimerization of butadiene to trans, trans, trans-1,5,9-cyclododecatriene which comprises a mixture of cocrystalline beta-TiCl$_3$·xAlCl$_3$ produced by reacting TiCl$_4$ with activated aluminum in an aromatic diluent at temperatures of about 25° to 85° C., the aluminum being activated by grinding in the presence of a solid essentially inert metal halide wherein $x$ represents a value of from about 0.3 to about 1 with a member selected from the group consisting of aluminum trialkyl, aluminum dialkyl halide and a mixture thereof.

2. The catalyst composition of claim 1 in which said cocrystalline TiCl$_3$·xAlCl$_3$ is employed with a mixture of AlR$_2$X and AlR$_3$ wherein R is a member selected from the group consisting of alkyl and aryl and X is halogen.

3. The catalyst composition of claim 1 in which the amounts of alkyl substituted aluminum compound is such that the alkyl to aluminum molar ratio in said catalyst is from about 1.7 to 2.6 and the aluminum to titanium atomic ratio is from about 1 to 10.

4. A novel solid crystalline, inorganic material, consisting essentially of a composition having the formula $TiCl_3 \cdot xAlCl_3$ produced by reacting $TiCl_4$ with activated aluminum in an aromatic diluent at temperatures of about 25° to 85° C., the aluminum being activated by grinding in the presence of a solid essentially inert metal halide in which $x$ represents a value of from about 0.3 to about 1, and having a crystal structure which yields the X-ray diffraction pattern represented in the following table, said structure being defined as beta-$TiCl_3 \cdot xAlCl_3$.

| Interplanar $d$-spacings A. units [1] | Relative intensity of X-ray diffraction peaks |
|---|---|
| 5.43 | Very Strong |
| 3.13 | Very weak |
| 2.91 | Weak |
| 2.76 | Very Strong |
| 2.72 | Very Weak |
| 2.57 | Weak |
| 2.13 | Strong |
| 2.05 | Very Weak |
| 1.99 | Very weak |
| 1.81 | Medium |
| 1.68 | Weak |
| 1.65 | Medium |
| 1.54 | Very weak |
| 1.51 | Weak |
| 1.46 | Very weak |
| 1.41 | Very weak |
| 1.38 | Weak |

[1] Because of a slight variation in unit cell dimensions with variation in AlCl₃ content, a slight deviation from these values may occur.

5. A composition according to claim 4 wherein the metal halide employed in the grinding operation is $AlCl_3$.

6. A composition according to claim 4 wherein the halide employed in said grinding operation is removed from the activated aluminum powder before said powder is used for reducing the $TiCl_4$.

7. A novel catalyst system for oligomerizing olefinically unsaturated organic compounds which comprises solid crystalline beta-$TiCl_3 \cdot xAlCl_3$ produced by reacting $TiCl_4$ with activated aluminum in an aromatic diluent at a temperature 25° to 85° C., the aluminum being activated by grinding in the presence of a solid essentially inert metal halide wherein $x$ represents the value of from 0 to about 1 in combination with an alkyl aluminum compound.

References Cited
UNITED STATES PATENTS

| | | | |
|---|---|---|---|
| 3,322,803 | 5/1967 | Vohwinkel | 260—429.5 |
| 3,109,822 | 11/1963 | Kaufman et al. | 252—429 |
| 3,157,708 | 11/1964 | Munley et al. | 260—666 |

DELBERT E. GANTZ, *Primary Examiner.*

V. O'KEEFE, *Assistant Examiner.*

260—666, 683.15; 252—429